Feb. 12, 1924.
H. THOMPSON
1,483,699
DRIVING GEAR
Filed Aug. 28, 1922
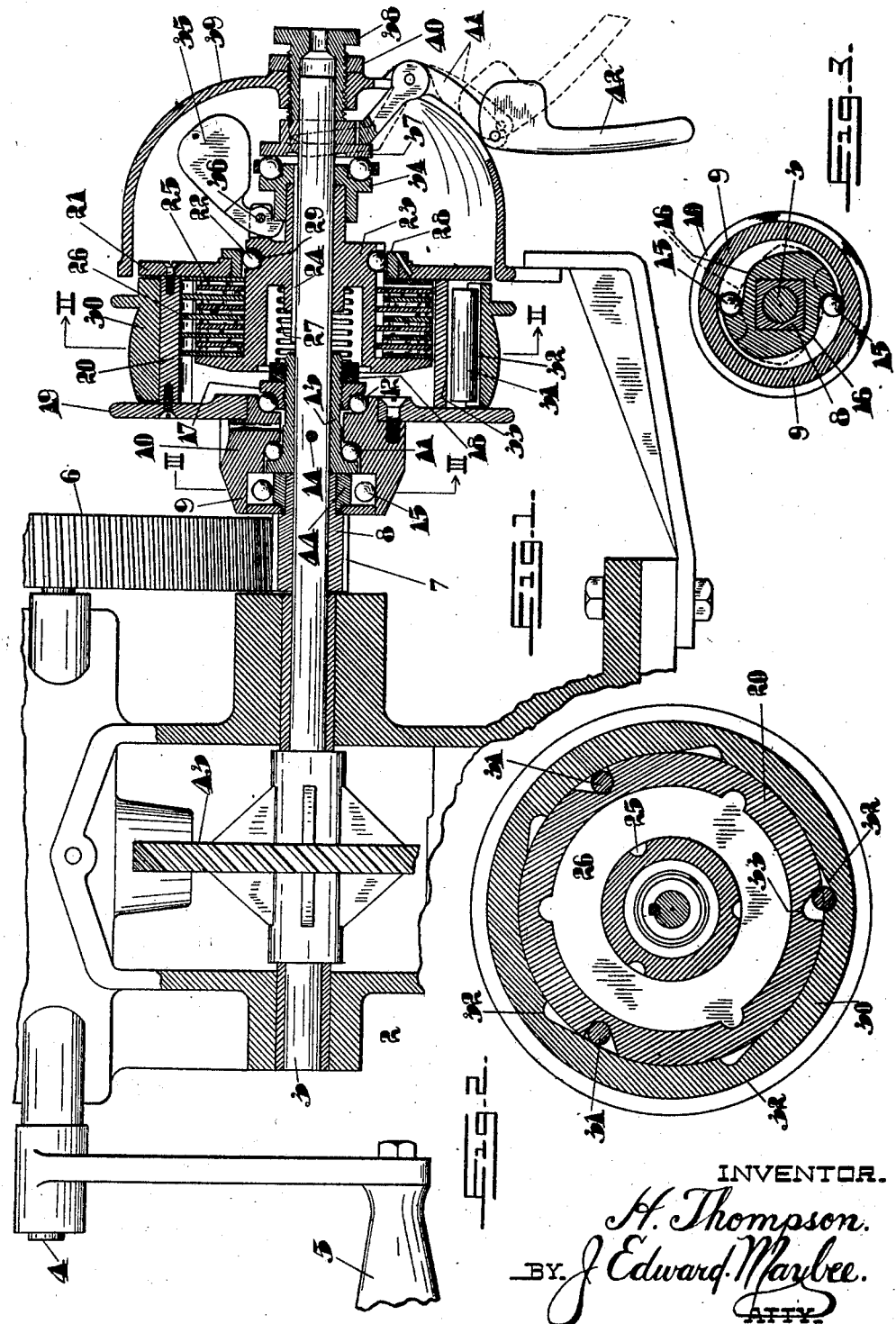
INVENTOR.
H. Thompson.
BY J. Edward Marbee.
ATTY.

Patented Feb. 12, 1924.

1,483,699

UNITED STATES PATENT OFFICE.

HERBERT THOMPSON, OF TORONTO, ONTARIO, CANADA, ASSIGNOR TO MASSEY-HARRIS COMPANY, LIMITED, OF TORONTO, ONTARIO, CANADA.

DRIVING GEAR.

Application filed August 28, 1922. Serial No. 584,922.

*To all whom it may concern:*

Be it known that I, HERBERT THOMPSON, of the city of Toronto, in the county of York, Province of Ontario, Canada, a subject of the King of Great Britain, have invented certain new and useful Improvements in Driving Gears, of which the following is a specification.

This invention relates to gearing especially adapted for driving centrifugal separators in which the separator bowl is required to be driven at a high and substantially constant speed, and my object is to devise a satisfactory gearing for the purpose, and which may be driven either by belt or by hand, when required, without it being necessary to remove the belt.

I attain my object by means of the constructions hereinafter described and illustrated in the accompanying drawings in which—

Fig. 1 is a longitudinal section, partly broken away, of my improved driving gear;

Fig. 2 a section on the line II—II of Fig. 1; and

Fig. 3 a section on the line III—III of Fig. 1.

In the drawings like numerals of reference indicate corresponding parts in the different figures.

1 is a frame suitably shaped to support the different parts, the frame in question being part of the frame of a centrifugal separator. In this frame in the bearings 2 is journalled the shaft 3. This shaft is shown as carrying a helical gear 43, which actuates the spindle of the separator, not shown. In the frame is also journalled the shaft 4, to which is secured a crank handle 5 by means of which the shaft may be manually rotated. This shaft carries a spur gear 6 which meshes with a pinion 7, which is formed on the sleeve 8 which is loose on the shaft 3. This sleeve 8 carries one part 44 of a ratchet clutch, the other part 9 of which is formed on a sleeve 10 journalled by means of the ball bearings 11 and 12 on a sleeve 13 secured to the shaft by means of a pin 14. A driving connection between the clutch member 44 on the sleeve 8 and the clutch member 9 is formed by the balls 15 which run in a recess formed in the member 9 and are adapted to be forced into engagement therewith by the cams 16 formed on the part 44. The arrangement is such that the sleeve 8, when rotated by the gear 6 and pinion 7, will drive the sleeve 9 which will drive the shaft 3 as hereinafter described and, when the gear 6 and pinion 7 is stationary, will allow the sleeve 9 to run ahead.

The ball bearings between the sleeve 10 and the sleeve 13 are of the ordinary double type, a nut 17 forming part of the race of the ball bearings 12 being threaded on the sleeve 13 for the purpose of adjusting the bearings, locking nuts 18 being provided for holding the nut 17, as adjusted.

The sleeve 10 is secured to a disk 19, which is secured to one side of a drum 20, to the other side of which is secured a disk 21, which is journalled by means of ball bearings 22 of a peculiar construction on the sleeve 23, which is connected with the shaft 3 by means of a feather key 24, so as to be slidable longitudinally of the shaft and to be revolvable therewith. The sleeve 23 and the drum 20 carry the disks 25 and 26 of a multiple disk clutch of ordinary type. The clutch is thrown in and out by the longitudinal movemet of the sleeve 23. A coil spring 27 engaging the sleeve 13 and the sleeve 23 tends to throw in the clutch.

It will be noted that the outer part 28 of the race for the ball bearings 22 is cylindrical, while the part 29 is cup-shaped. This permits the sleeve 23 to move longitudinally of the shaft as hereinbefore described, while the bearings 22 are also adapted to properly assist the bearings 11 and 12 in providing adequate bearings for the rotary structure formed by the parts 10, 19, 20 and 21.

Mounted on the drum 20 is an annular member 30 forming a belt pulley. Between this and the drum 20 are located a series of rollers 31, which are adapted to be received either wholly or partly in the wedge-shaped notches 32 and 33 formed in the adjacent peripheries of the pulley 30 and the drum 20, thus forming a ratchet clutch of known type, which will form the driving connection between the pulley and drum when the former is rotated in one direction, and which will allow the drum to run ahead of the pulley when the pulley is stationary. The result of this arrangement is that as long as the pulley is being driven and the clutch is in, the shaft 3 is driven, the ratchet clutch formed between the parts 44 and 9 slipping to allow the pinion 7 to remain stationary, so that there is no movement of the shaft 4 with its connected crank handle. If, however, the pulley 30 is stationary, the shaft 3 may be rotated through the medium of the crank handle 5 and the gearing connected therewith, as there is then a driving connection between the parts 44 and 9 of the ratchet clutch and slip occurs between the parts 30 and 20 as hereinbefore described.

The control of the clutch is either automatic or manual, the automatic operating means being for the purpose of throwing out the clutch as soon as a predetermined maximum speed is exceeded.

On the sleeve 23 is slidably mounted a collar 34. With the inner end of this collar, which forms an abutment engage the inner ends of the weighted levers 35 mounted on lugs 36 formed on the sleeve 23.

On the shaft 3 is located a thrust collar 37, which may be adjusted by means of a hollow screw 38 sleeved on the end of the shaft behind the thrust member and threaded through the outer end of the casing 39 secured on the frame 1. A lock nut 40 provides means whereby this adjusting screw may be clamped, as adjusted.

When the crank is in operation, the weighted levers 35 tend to throw out and, as soon as the critical speed is exceeded, will throw out the clutch as desired, thus freeing the shaft 3 from the driving pulley.

As it is sometimes desirable to throw out the clutch by hand a slot is provided in the casing 39 on the frame, and a lever 41 operates through the slot in this part. The inner end of this lever is forked to engage the thrust collar, and to its other end is pivoted a cam lever 42, which is forked to embrace the lever. This lever is adapted to engage the part 39 on the opposite sides of the slot through which the lever 41 operates.

It is evident that by operating this hand lever that the clutch may be thrown out as desired.

From the above description, it will be seen that I have devised a driving gear which will satisfactorily attain the objects of my invention as set out in the preamble to the specification.

What I claim as my invention is:—

1. In combination a shaft; a friction clutch member slidably and non-rotatably mounted on the shaft; a complementary friction clutch member rotatable relative to the shaft; a collar co-axial with the slidable clutch member and rotating therewith; a centrifugal member rotating with said slidable clutch member and adapted to engage said collar; a thrust member co-axial with the shaft and engageable by the collar; a spring tending to throw in the clutch; a pulley co-axial with the shaft; a ratchet clutch driving connection between said pulley and the rotatable clutch member adapted to permit the said member to run ahead of the pulley; a rotatable member loose on the shaft; and a ratchet clutch driving connection between said member and the rotatable clutch member adapted to permit the clutch member to run ahead of the said rotatable member.

2. A driving gear constructed as set forth in claim 1 provided with means for moving the thrust member to throw out the friction clutch.

3. In combination a shaft; a friction clutch member slidably and non-rotatably mounted on the shaft; a sleeve secured to the shaft; a complementary friction clutch member mounted to rotate on said sleeve and having a sliding and rotatable engagement with the slidable friction clutch member; a collar co-axial with the slidable clutch member and rotatable therewith; a centrifugal member rotating with said slidable clutch member and adapted to engage said collar; a thrust member co-axial with the shaft and engageable by the collar; and a spring mounted between said sleeve and said slidable clutch member tending to throw in the clutch.

4. A driving gear constructed as set forth in claim 1 in which the rotatable clutch member is formed as a drum and in which the pulley is formed as an annulus sleeved on the drum and the first mentioned ratchet clutch driving connection is formed between the periphery of the drum and the pulley.

5. In combination a shaft; a friction clutch member slidably and non-rotatably mounted on the shaft; a sleeve secured to the shaft; a complementary friction clutch member mounted to rotate on said sleeve and having a sliding and rotatable engagement with the slidable friction clutch member; a collar co-axial with the slidable clutch member and rotatable therewith; a centrifugal member rotating with said slidable clutch member and adapted to engage said collar; a thrust member co-axial with the shaft and engageable by the collar; manually operable means for longitudinally moving the thrust member on the shaft to throw out the clutch; and a spring tending to throw in the clutch.

6. In combination a frame; a shaft; a friction clutch member slidably and non-rotatably mounted on the shaft; a sleeve secured to the shaft; a complementary friction clutch member mounted to rotate on said sleeve and having a sliding and rotatable engagement with the slidable friction clutch member; a collar co-axial with the slidable clutch member and rotatable therewith; a centrifugal member rotating with said slidable clutch member and adapted to engage said collar; a thrust member co-axial with the shaft and engageable by the collar; a tubular adjusting screw threaded through a part of the frame co-axial with the shaft and engaging said thrust member; and a spring tending to throw in the clutch.

Signed at Toronto, Ont., this 17th day of August, 1922.

HERBERT THOMPSON.